United States Patent [19]

Argiriadis

[11] Patent Number: 4,874,097

[45] Date of Patent: Oct. 17, 1989

[54] MECHANISM FOR SEPARATING THE CLOSED PISTACHIO NUTS FROM THE OPEN PISTACHIO NUTS OF AEGINA AND ROTTEN LEGUMES

[76] Inventor: Nikos Argiriadis, Meliteos 6, Neapoli, Thessaloniki 567.27, Greece

[21] Appl. No.: 169,588

[22] Filed: Mar. 17, 1988

[30] Foreign Application Priority Data

Mar. 19, 1987 [GR] Greece .................................. 870447

[51] Int. Cl.$^4$ ................................................ B07C 5/34
[52] U.S. Cl. .................................... 209/616; 209/700; 209/940
[58] Field of Search ............... 209/615, 616, 618, 627, 209/667, 669, 671, 673, 700, 940

[56] References Cited

U.S. PATENT DOCUMENTS

| | | | |
|---|---|---|---|
| 867,276 | 10/1907 | Jenkins | 209/616 X |
| 2,614,691 | 10/1952 | Slayter | 209/671 X |
| 2,966,988 | 1/1961 | Nury et al. | 209/700 X |
| 3,200,945 | 8/1965 | Cota | 209/616 |
| 3,731,797 | 5/1973 | Tanner | 209/700 |

FOREIGN PATENT DOCUMENTS 928017 5/1955 Fed. Rep. of Germany ...... 209/615

Primary Examiner—Johnny D. Cherry
Assistant Examiner—Gary C. Hoge
Attorney, Agent, or Firm—Browdy & Neimark

[57] ABSTRACT

Good legumes or pistachio nuts are separated from those to be discarded by feeding the pistachios or legumes to a longitudinally inclined trough between a laterally inclined plate and a rotating cylinder, such cylinder having outwardly projecting edges along its exterior surface. On the opposite side of such cylinder is provided a second cylinder having a brush on its outer circumference, and the two cylinders are driven in opposite directions. Good legumes and pistachio nuts are merely tumbled within the trough by the first cylinder and are fed partly by gravity to a collector at the foot of the device. The unsatisfactory legumes and pistachios are picked up by the outwardly projecting edges of the first cylinder and flipped over where they are then brushed downwaardly off the first cylinder by the brush of the second cylinder.

3 Claims, 4 Drawing Sheets

MECHANISM FOR SEPARATING THE CLOSED PISTACHIO NUTS FROM THE OPEN PISTACHIO NUTS OF AEGINA AND ROTTEN LEGUMES

FIELD OF INVENTION

The present invention relates to an apparatus for separating closed pistachio nuts from opened nuts, and for separating rotten nuts from those which are not rotten.

SUMMARY

This mechanism is for separating the closed pistachio nuts of Aegina from the opened ones and as well as for separating the rotten legumes from the good.

It is applied on a base of whichever form and dimension, with as many sets of cylinders, according to the production desired. Each set of mechanism consists of the following parts:

(a) One cylinder, which on its external surface, has metal edges on its circumferences and along it.

(b) One cylinder, which has brushes on its circumference and along it, can be of plastic, metal or natural hair.

(c) A metal plate to which pistachio nuts or legume are dropped. The diameter and length of cylinders (a) an be in whichever dimension, and the material of the cylinder to be of metal, wood or plastic.

This mechanism is set on ball bearings and its movement is activated by variable speed motors. The movement of the two cylinders operate in a reverse motion each driven by one of the motors, in order that the cylinder with the brushes, during the rotation, cleans the cylinder with the edges at their contact point, so that the pistachio nuts, which are caught on the edges, are released with a downward movement.

The mechanism is installed on a metal base, which has slopes. Under the mechanism there are funnels for gathering the pistachio nuts.

DETAILED DESCRIPTION OF EMBODIMENT

Figure 1:
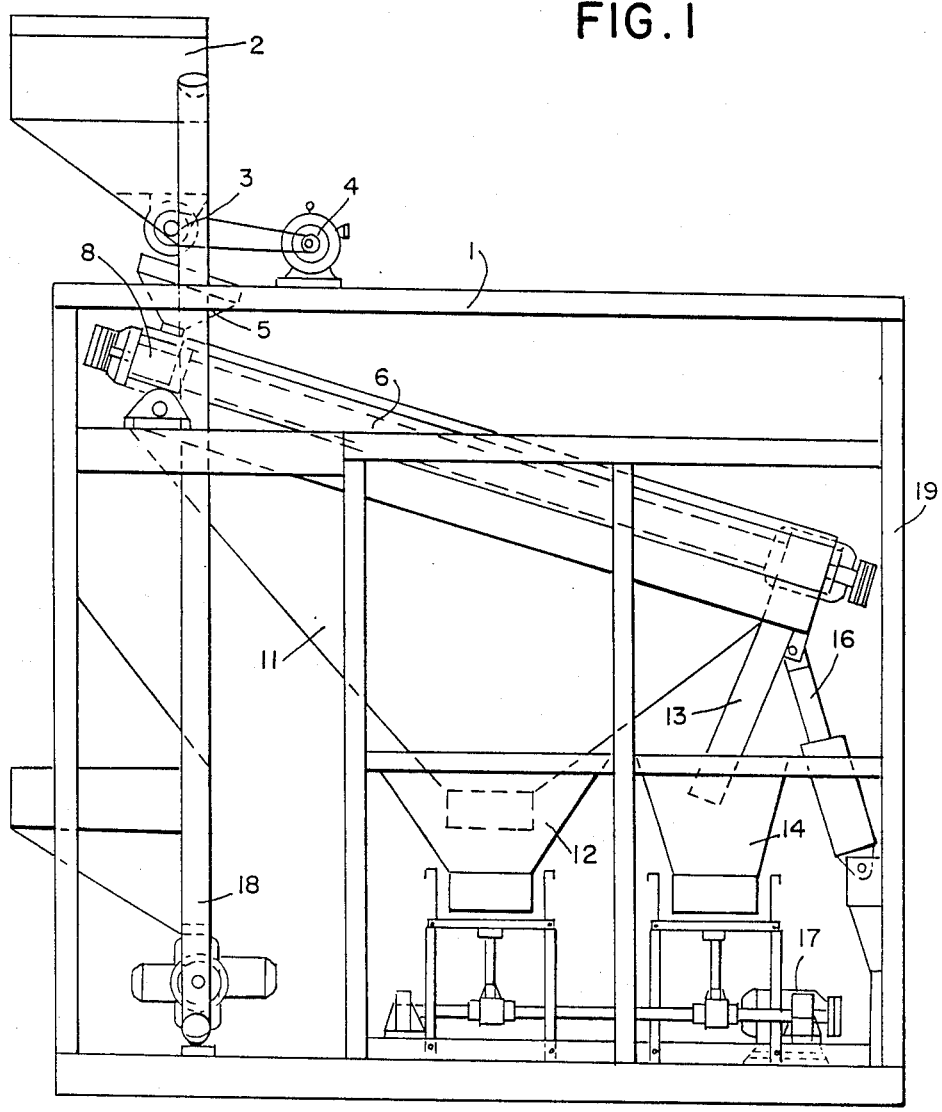
FIG. 1 is a side elevational view of apparatus according to the present invention.
Figure 2:
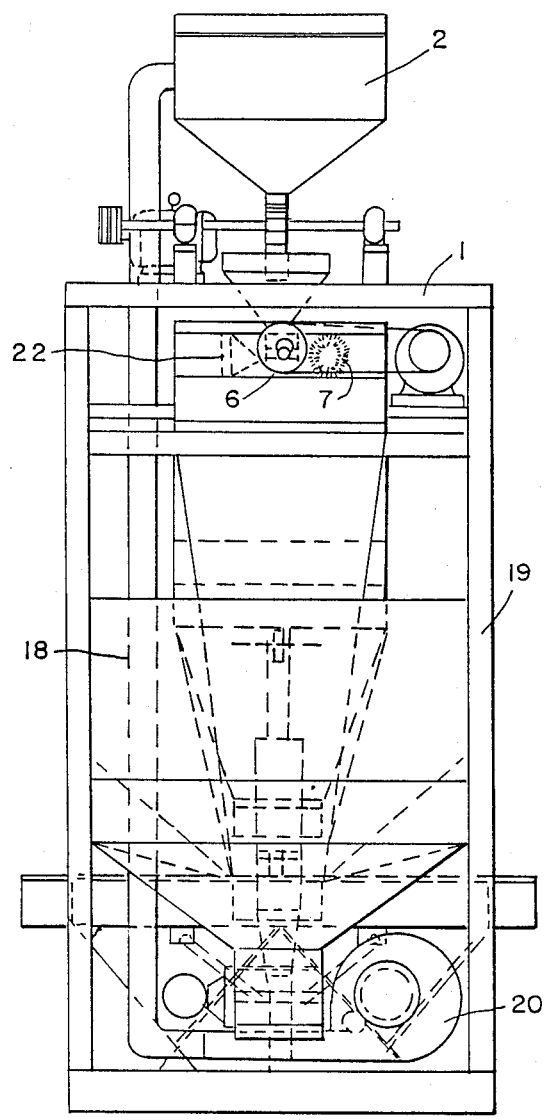
FIG. 2 is a front elevational view of the apparatus of FIG. 1.

With reference to FIG. 1, there is shown a separating mechanism including support elements 1 and 19, a feed hopper 2 for the nuts or legumes, a blower 20 with a feed pipe 18 leading to the hopper 2, a feeding mechanism 3 at the bottom of the feed hopper 2 driven by a suitable motor 4, and a receiving funnel 5 for receiving the nuts or legumes passing through the feeder 3 from the hopper 2.

Figure 3:
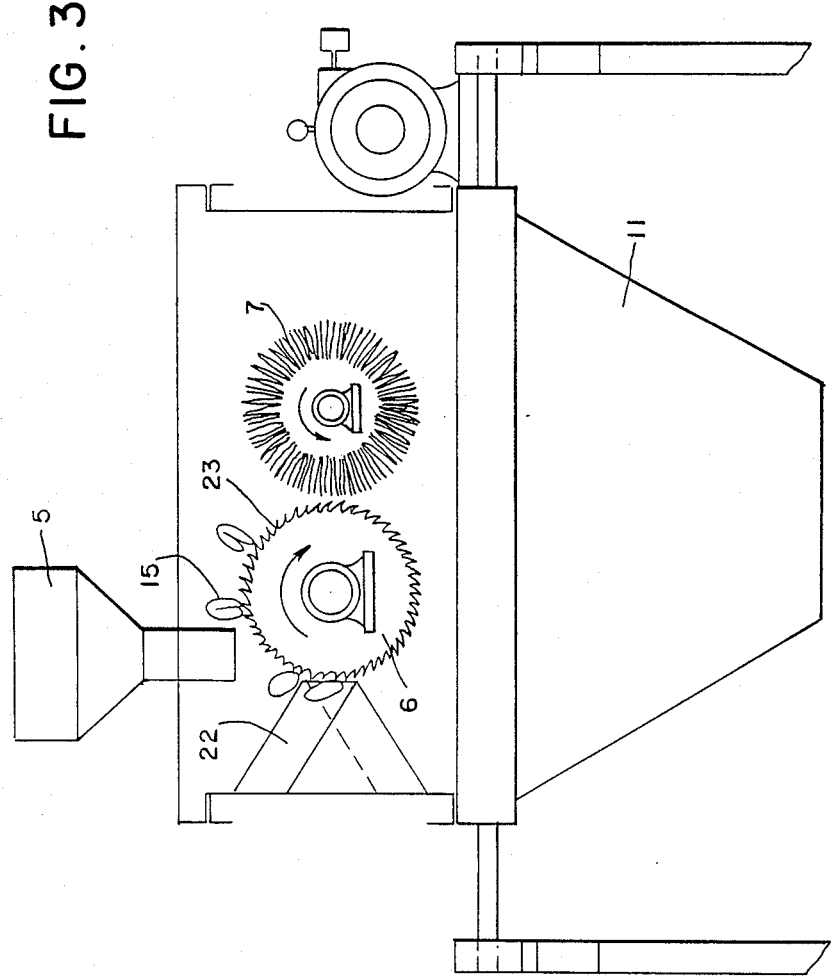
FIG. 3 is a detailed elevational view of a part of the apparatus of FIGS. 1 and 2.
Figure 4:
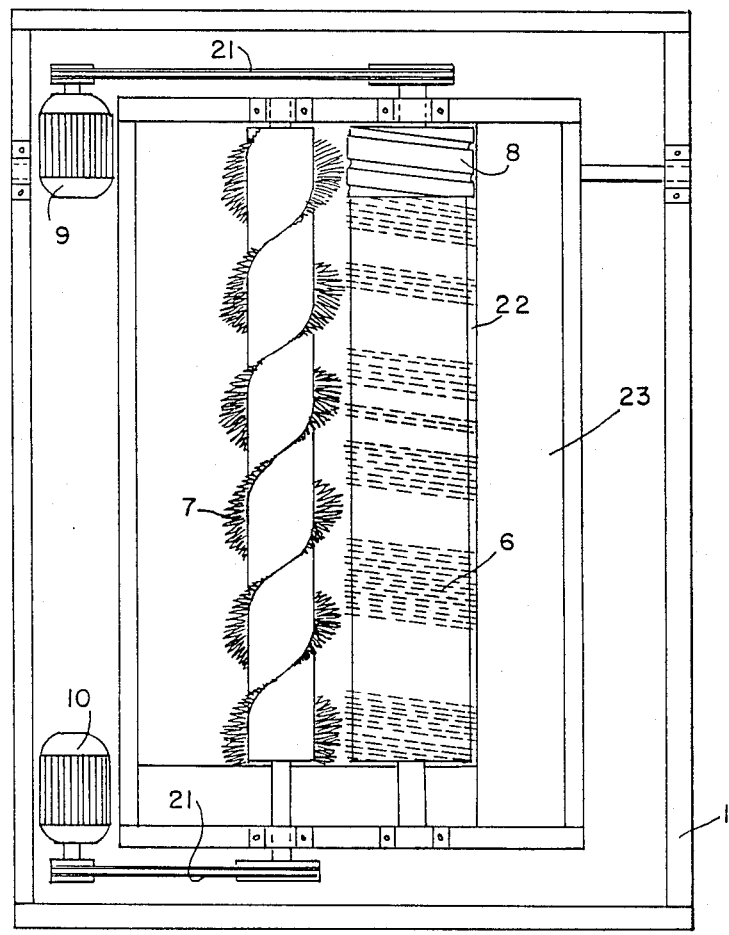
FIG. 4 is a top view of the mechanism of FIG. 3.

Below the funnel 5 and off to one side thereof is a cylinder 6 (see FIG. 3) having outwardly projecting edges 23 along its external surface. Adjacent the cylinder 6 on one side is a metal plate 22, and on the opposite side from the funnel 5 is a second cylinder 7 which has brushes on its circumference, such as a spiral brush as shown in FIG. 4. A longitudinally inclined trough is created by the metal plate 22 and the cylinder 6.

Suitable collecting hoppers 11, 12, 13, and 14 are provided for collecting nuts or legumes from opposite sides of the cylinder 6, the latter (see FIG. 1) being at the foot of cylinder 6.

The cylinders 6 and 7 are rotated in opposite directions by, respectively, the motors 9 and 10 operating through suitable belts or chains 21 (see FIG. 4). As can be seen in FIG. 1, the rollers 6 and 7 are longitudinally inclined downwardly from the hopper end, and the angle of longitudinal inclination can be controlled by suitable hydraulic means 16.

The operation of the mechanism is as follows:

The pistachio nuts or legumes 15 fall into the trough between the cylinder 6 and the metal plate 22 (see FIG. 3) and are carried into the metal plate 22, which plate 22 is inclined laterally downwardly to the cylinder 6 with the edges 23. As the cylinder 6 with the edges 23 spins, it forces the pistachio nuts or legumes in the trough to change positions and simultaneously to slide along the cylinder 6 because of the longitudinal inclination. During the sliding of the pistachio nuts or the rotten legumes (or with holes) they are caught by the edges 23 of the cylinder 6 and during the rotation of the cylinder 6 the are spun to the opposite side. During this process the nuts reach the contact point of the cylinder 7 with the brushes. This cylinder at the contact point with the other cylinder 6 (with the edges) has the same downwared direction and so the defective nuts or legumes are released and fall into the outlet funnel 11 of open pistachio nuts or pierced legumes, while the closed pistachio nuts or good legumes, after having passed the longitudinal course between the metal plate and the cylinder 6 with edges, fall to the outlet funnel 13 of closed pistachio nuts or good legumes.

It will be obvious to those skilled in the art that varoius other changes and modifications may be made without departing from the scope of the invention and the invention is not to be considered limited to which is shown in the drawing and/or described in the specification.

What is claimed is:

1. An apparatus for separating open or rotten legumes or pistachio nuts from closed or good legumes or pistachio nuts, comprising a first elongated cylinder having outwardly projecting edges along its exterior surface;

a second cylinder having at least one brush on its outer circumference;

means for positioning said cylinders in side-by-side relationship at a longitudinal inclination so that said cylinders have an upper end and a lower end;

a laterally inclined plate adjacent said first cylinder on a side thereof opposite from said second cylinder, said inclined plate and said first cylinder forming a trough therebetween;

means for feeding plastic pistachio nuts or legumes to the upper end of said first cylinder so that said nuts or legumes fall in said trough;

means for rotating said cylinders in opposite directions whereby rejected nuts or beans are caught by said outwardly projecting edges and transferred by said first cylinder from said trough to said second cylinder; and collection means for good pistachio nuts or legumes at the lower end of said first cylinder.

2. An apparatus according to claim 1 further comprising collection means for open or rotten legumes or pistachio nuts below said first and second elongated cylinders along the lengths thereof.

3. An apparatus according to claim 1 wherein said outwardly projecting edges are metal.

* * * * *